UNITED STATES PATENT OFFICE 2,449,987

PREPARATION OF SUBSTITUTED ACIDS FROM LACTONES

Thomas L. Gresham, Akron, Ohio, assignor to The B. F. Goodrich Company, New York, N. Y., a corporation of New York No Drawing. Application October 5, 1945, Serial No. 620,655

17 Claims. (Cl. 260—454)

This invention relates to a method of preparing organic compounds and is particularly concerned with the reaction of beta-lactones with ionizable inorganic salts.

It is disclosed in U. S. Patent No. 2,356,459 to Frederick E. Küng that beta-lactones, that is, lactones or inner esters of beta-hydroxy carboxylic acids may be prepared in good yields by the reaction of a ketene with an aldehyde or ketone. In this manner, beta-propiolactone (also called hydracrylic acid lactone) which has the structure

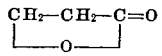

is economically obtained from ketone and formaldehyde.

I have now discovered that beta-propiolactone and also the other beta-lactones, will react with ionizable inorganic salts in the presence of a polar solvent for the reactants such as water, to produce useful organic compounds, in most cases a salt of a beta-substituted carboxylic acid, which may then be converted into the free acid by addition of mineral acid; and that this reaction provides a convenient and economical route to numerous organic compounds, many of which have heretofore been obtained only with difficulty and/or from relatively costly raw materials. For example, I have found that common salt, sodium chloride, readily reacts with beta-propiolactone in aqueous solution to give, on acidification of the solution, beta-chloro propionic acid.

Since ionizable inorganic salts such as sodium chloride do not ordinarily react with organic compounds in which the atoms are bound together by the sharing of electrons, this reaction is unique in chemical synthesis. Its mechanism has not been established with certainty but apparently it proceeds directly without the formation of intermediates, the lactone ring being broken between the ring oxygen and the beta carbon, with the anion of the salt attaching itself to the beta carbon and the cation to the oxygen.

In carrying out the reaction, it is generally necessary to employ a polar solvent for the reactants, in order that the reactants may be brought into effective contact with one another, but no other special conditions are necessary. The polar solvent may be any solvent in which the salt will dissolve and ionize and which will also dissolve the lactone. Water dissolves many salts and many beta-lactones; hence the carrying out of the reaction in aqueous solution utilizing a water-soluble salt and a water-soluble lactone is by far the most convenient method of procedure, but with certain reactants the use of polar organic solvents such as alcohols, organic acids, nitroparaffins or the like may be desirable. Other conditions such as concentration of reactants, temperature of reaction and pH of solution are not critical factors and may be varied widely, but in some instances, they do influence the yield of product and are preferably controlled in such a manner as to minimize the occurrence of possible side reactions. While preferred conditions for specific reactions will be set forth more particularly in the examples hereinbelow, it may be said in general that the use of 1 to 10 molecular proportions of beta-lactone, 1 molecular proportion preferably, to 1 to 10 molecular proportions of salt; the use of temperatures below 100° C. preferably between −25 and 50° C.; and working in solutions of a pH of about 2 to 10 are most desirable because of the tendency of the beta-lactone to polymerize when heated in the presence of only traces of certain salts and to hydrolyze in strongly alkaline solutions.

The nature of the ionizable inorganic salt may be varied widely and many different organic compounds thereby obtained. In general, inorganic salts in which the anion is composed of non-metallic elements are employed. Non-metallic elements include (see page 314 of The Handbook of Chemistry and Physics, 27th Edition,) in addition to hydrogen, those which form stable gaseous hydrides including the halogens (fluorine, chlorine, bromine and iodine), the chalcogens (oxygen, sulfur, selenium and telurium), nitrogen, phosphorus, carbon, boron and silicon. Salts of this nature in which the cation is an alkali metal or an ammonium radical are generally soluble and are preferred, but alkaline earth metal salts and other metal salts may also be used when soluble and ionizable in the solvent.

When the salt is one in which the anion is monovalent and is composed of non-metallic elements other than oxygen, (that is, an anion of a hydracid) the reaction proceeds quite readily to yield a beta-substituted carboxylic acid. Thus, inorganic halides react with beta-lactones to yield on acidification of the solutions, beta-halo carboxylic acids; inorganic hydrosulfides yield beta-mercapto carboxylic acids and inorganic cyanides and thiocyanates yield, respectively, beta-cyano and beta-thiocyano carboxylic acids, all in accordance with the following equation:

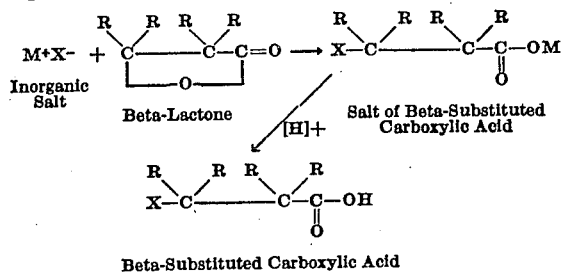

Beta-Substituted Carboxylic Acid where M and A are respectively the cation and anion of the salt and R is hydrogen or a substituent radical.

The yield of product obtained by this reaction depends to a great extent on the relative quantities of salt and beta-lactone. When a molecular excess of the salt over that of the beta-lactone is present, the yields of the beta-substituted acid are increased, highest yields being secured with from 2 to 5 molecular proportions of salt to lactone. This is due to the fact that the beta-substituted carboxylic acid salt first formed also reacts with the beta-lactone (as is disclosed in the copending application of Thomas L. Gresham and Jacob Eden Jansen, Serial No. 620,658, filed October 5, 1945, relating to the reaction of beta-lactones with salts of organic carboxylic acids) in the manner indicated by the following equation:

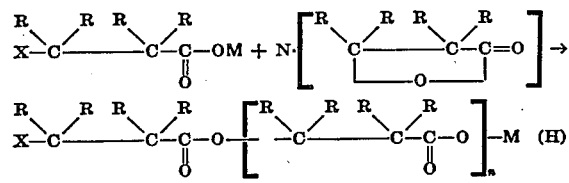

to produce beta-polyacyloxy carboxylic acids. It is apparent that this side reaction is repressed by the use of an excess of the inorganic salt.

A particularly useful embodiment of the invention comprises the reaction of beta-lactones with inorganic halides to produce beta-halo carboxylic acids, this reaction enabling halogen atoms to be economically introduced in the beta position in organic molecules a result not readily or economically secured by the halogenation processes heretofore known. The following specific examples, in which all parts are by weight, of the preparation of beta-halo propionic acids from beta-propiolactone illustrate this embodiment.

Example I

An aqueous solution is prepared by admixing 176 parts (approximately 3 moles) of sodium chloride with 400 parts of water. To this solution, there is then added with stirring over a period of about one hour 72 parts (1 mole) of beta-propiolactone, the temperature of the solution at the start of addition being about 30° C. and rising during the addition to about 45° C. After the addition, the solution is acidified by the addition of a molar proportion of concentrated hydrochloric acid and is then extracted with ether. Upon distilling the ether extract, there is obtained 80 parts (74%) of beta-chloro propionic acid B. P. 88–90° C./1 mm.; M. P. 41–42° C.

Example II

Example I is repeated using equimolecular proportions of sodium chloride and beta-propiolactone. The yield of beta-chloro propionic acid is only about 45%. This example compared with Example I shows that higher yields are secured when an excess of the salt is present.

Example III

The procedure of Example I is again repeated, this time utilizing an aqueous solution containing one molecular proportion of sodium chloride and 0.5 molecular proportion of hydrogen chloride, and adding one molecular proportion of beta-propiolactone to the solution. The yield of beta-chloro propionic acid is 80.3%, and when the example is repeated using one molecular proportion of hydrogen chloride, the yield is 90%.

This example shows that high yields are secured with equimolecular proportions of salt and lactone when the reaction is carried out in the presence of hydrochloric acid. In this connection, it should also be mentioned that the reaction of beta-lactones with hydrochloric acid, in the absence of salt, yields beta-chloro propionic as is disclosed in the copending application of Thomas L. Gresham and Forrest W. Shaver, Serial No. 620,666, filed October 5, 1945.

Example IV 72 parts of beta-propiolactone are mixed with a solution of 60 parts of sodium chloride in 300 parts of water. The solution is cooled to −10° C. and stirred while hydrogen chloride is bubbled into the solution for about one hour keeping the temperature at about −10° C. The reaction mixture is extracted with ether and from the ether extract on distillation there is obtained a 70% yield of beta-chloro propionic acid. Comparing this example with Example III, wherein the temperature of reaction was about 30 to 45° C., it is seen that the temperature of reaction is not critical, but that higher yields are obtained at the latter temperature than when working at temperatures below zero. For the reaction of halides with beta-lactones temperatures of 0 to 50° C. are most desirable, but temperatures as low as −25° C. or lower or as high as 100° C. or higher are also operable.

Example V

Using the procedure and conditions of Example I, 5 moles of lithium chloride are reacted in aqueous solution with one mole of beta-propiolactone. The yield of beta-chloro propionic acid is about 90%. The large excess of salt and also a partial salting out of the lithium salt of the beta-chloro propionic acid formed, thereby repressing its reaction with the lactone, are probably responsible for the high yield of product.

Example VI

Again using the procedure and conditions of Example I, 3.1 moles of ammonium chloride and one mole of beta-propiolactone are reacted to produce a 80% yield of beta-chloro propionic acid. When the example is repeated using one mole of calcium chloride and one mole of beta-propiolactone, the yield is 63%. With potassium bromide and potassium iodide in place of ammonium chloride, yields of 80–100% of beta-bromo propionic acid and beta-iodo propionic acid respectively are obtained. Other water-soluble salts of the hydrohalic acids, also called halogen hydracids, (i. e., HCl, HBr, HI and HF) such as barium chloride, potassium chloride, sodium fluoride, sodium bromide, ammonium iodide, and the like, may also be used with equivalent results.

Other embodiments of the invention employing a salt of an inorganic acid comprising a monovalent anion composed of more than one non-metallic element other than oxygen are illustrated in the following examples:

Example VII

To an aqueous solution containing 60 parts of sodium cyanide in 150 parts of water, there is added with stirring at room temperature 72 parts of beta-propiolactone. The solution is acidified with mineral acid and excess HCN removed under vacuum. It is then extracted with ether and the ether extract distilled. A 30% yield of beta-cyano propionic acid (B. P. 113–115/3 mm.) is obtained.

Instead of attempting to isolate the beta-cyano propionic acid from the reaction mixture as in Example VII which is difficult when the solvent is water, it may be desirable to hydrolyze the cyano acid directly to succinic acid. As disclosed in my copending application Ser. No. 620,656, filed October 5, 1945, high yields of the dicarboxylic acid are thus obtained.

Example VIII 40.5 parts of sodium thiocyanate are dissolved in 100 parts of water and the solution is cooled to 0° C. 36 parts of beta-propiolactone are slowly added to the cooled solution over a period of about one hour. The temperature rises from the heat of reaction but does not exceed 30° C. After the addition, the solution is cooled to 20° C. and 50 parts of 37% aqueous HCl are added. It is then evaporated to remove a part of the water, is extracted with ether and the ether removed to leave about 30 parts of beta-thiocyano propionic acid, a thick clear oil.

Example IX

An aqueous solution of sodium hydrosulfide is prepared by saturating a solution of 40 parts of sodium hydroxide in 200 parts of water with gaseous hydrogen sulfide. 72 parts of beta-propiolactone are then added at a temperature of 20–30° C. The reaction product is acidified and extracted with ether. From the ether extract thiohydracrylic acid (beta-mercapto propionic acid) is obtained.

The reaction of hydrosulfides (and also sulfides) with beta-lactones is further disclosed and claimed in my copending application Ser. No. 620,657 filed October 5, 1945.

Although the above examples are confined to the reaction of beta-lactones with inorganic salts containing a monovalent anion composed of one or more non-metallic elements other than oxygen, other inorganic salts containing monovalent anions composed of any of the non-metallic elements and also salts containing polyvalent anions composed of any of the non-metallic elements may be reacted with beta-lactones. With salts containing polyvalent anions a number of lactone molecules corresponding to the valency of the anion may react. As examples of such salts, there may be mentioned the alkali metal and ammonium borates, bromates, carbonates, bicarbonates, nitrates, nitrites, phosphates, phosphites, silicates, sulfates, bisulfates, persulfates, sulfites, thiosulfates, thiocarbonates, sulfoxylates and the like. Of these, salts which are strongly oxidizing in nature such as the persulfates, chlorates, perchlorates, bromates, iodates and hypochlorites, are not preferably used since oxidation may accompany the reaction to form a beta-substituted carboxylic acid and thus lead to a variety of organic products. Moreover, even with non-oxidizing salts of certain oxyacids, the product first formed, that is, a salt of a carboxylic acid having a group corresponding to the anion of the salt attached to the beta-position, is often so unstable that hydrolysis may occur, with the result that the product finally isolated is a beta-hydroxy acid. For example, when beta-propiolactone is reacted with aqueous sodium bicarbonate, sodium hydracrylate is obtained. The reaction is believed to proceed as indicated in the following equation, the compound within the brackets being an intermediate of only transitory existence:

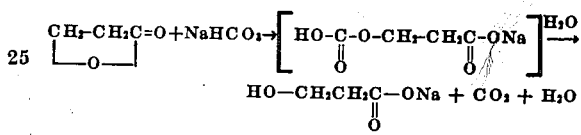

It should be emphasized, however, that useful reactions occur, regardless of the particular inorganic salt used and hence the invention is generic to inorganic salts.

When beta-lactones are reacted with salts of nitrogen oxyacids, the corresponding beta-substituted carboxylic acids are obtained. For example, the reaction between sodium nitrite and beta-propiolactone produces principally beta-nitro propionic acid, some of the nitrate,

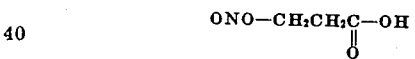

also probably being formed. With sodium nitrate the nitric acid ester,

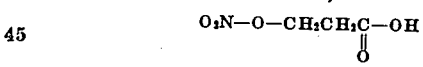

is the product.

The reaction of beta-lactones with salts of sulfur oxyacids is illustrated by the following examples:

Example X

An aqueous solution of sodium thiosulfate is prepared by dissolving 124.1 parts of sodium thiosulfate decahydrate in 100 parts of water. To this solution there is then added slowly and with stirring 36 parts by weight of beta-propiolactone, the temperature of the solution during the addition being between room temperature and 35° C. After the reaction solution is allowed to stand for 24 hours, concentrated sulfuric acid is added whereupon a precipitate of sulfur is formed. The sulfur is removed by filtration and the filtrate made acid by the addition of more sulfuric acid. It is then heated on a steam bath for 10 hours. Water is then added and an organic precipitate forms. The precipitate and the aqueous solution are extracted with ether. From the ether extract 7.7 g (14%) of thiohydracrylic acid B. P. 122° C./2 mm., and 30.5 g. (29%) of beta-dithio dipropionic acid,

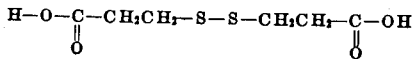

M. P. 152–155° C., are obtained. It is believed that the dithio acid results from the reaction indicated by the following equation:

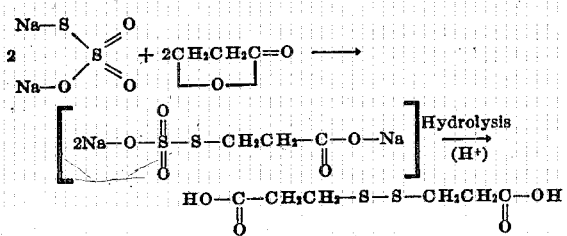

Example XI 67.1 parts of ammonium sulfite are dissolved in 120 parts of water and 36 parts of beta-propiolacetone are then added while maintaining the temperature at about 5° C. A reaction occurs which is assumed to produce the ammonium salt of beta-sulfo propionic acid. This acid is isolated in the form of its barium salt, which is soluble in hot water, but not in cold, by adding barium hydroxide to the solution, filtering while hot to remove barium sulfite, refluxing until ammonia is no longer evolved, precipitating excess barium as the carbonate with carbon dioxide, again filtering hot and cooling the filtrate whereupon a solid is precipitated. Analysis of the precipitate shows that it consists of the barium salt of beta-sulfo propionic acid in substantially pure form. It is thus confirmed that the reaction proceeds as indicated by the equation:

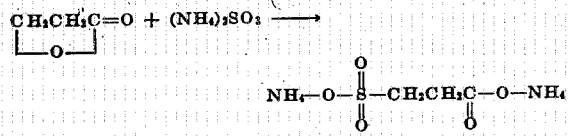

The invention has been described hereinabove with particular relation to beta-propiolactone, since this compound, the simplest possible beta-lactone, is preferably used because of its low cost and the ease with which it reacts with inorganic salts. However, the homologs of beta-propiolactone, that is, other saturated aliphatic beta-lacetones such as beta-butyrolacetone, beta-isobutyrolactone, beta-valerolactone, beta-isovalerolactone, beta-n-caprolactone, alpha-ethyl-beta-propiolactone, alpha - isopropyl-beta - propiolactone, alpha - butyl - beta - propiolactone, alpha-methyl-beta-butyrolactone, alpha-ethyl-beta - butyrolactone, beta-methyl-beta - valerolactone and the like as well as other beta-lactones may also be reacted with inorganic salts. Other known beta-lactones include lactones of beta-hydroxy-monocarboxylic acids containing cycloalkyl, aryl and aralkyl substituents such as beta-cyclohexyl - beta - propiolactone, beta - phenyl-beta-propiolactone, alpha-phenyl-beta-propiolactone, beta-benzyl-beta-propiolactone and the like, all of which, like beta-propiolactone and its homologs, are of the general structure

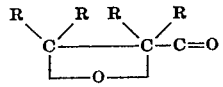

wherein R is hydrogen or an unreactive hydrocarbon group (i. e., a hydrocarbon group free from aliphatic unsaturation) and may be prepared in the manner described in the above-mentioned Küng patent. Still other known beta-lactones include lactones of unsaturated beta-hydroxy carboxylic acids, mono-beta lactones of boxylic acids and dilactones of dicarboxylic acids in which at least one of the lactones is beta, examples of which are alpha, alpha-dimethyl-beta-propiolactone-beta-carboxylic acid; trimethyl - beta - propiolactone - beta - carboxylic acid; beta, beta-dimethyl-beta-propiolactone-alpha-carboxylic acid; trimethyl-beta-propiolactone-alpha-carboxylic acid and the beta-delta-dilactone of citrylidene malonic acid, all of which like the beta-lactones before mentioned are composed exclusively of hydrogen, carbon and carbonoxy

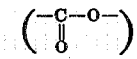

oxygen atoms. In addition to these compounds other compounds containing the structure

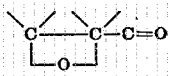

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta-(O-nitro-m-chlorophenyl) - beta - propiolactone; beta - (O-nitro-m-methoxyphenyl)-beta-propiolactone; alpha - hydroxy - beta - phenyl - beta-propiolactone and alpha-bromo-beta, beta-dimethyl - beta - propiolactone - alpha - carboxylic acid.

Thus, any of the generic class of beta-lactones may be used in the practice of this invention. When the reaction is carried out in aqueous solution, as is preferred, beta-lactones which are soluble in water (those beta-lactones containing no more than about six carbon atoms possess this property) are of course used.

Numerous modifications and variations in the invention as herein described will be apparent to those skilled in the art and are within the spirit and scope of the appended claims.

I claim:

1. The method of preparing a beta-halo propionic acid which comprises reacting in aqueous solution beta-propiolactone and a water-soluble ionizable inorganic salt of a hydrohalic acid, and then acidfying the solution.

2. The method of preparing a beta-halo propionic acid which comprises reacting in aqueous solution beta-propiolactone and a molecular excess of a water-soluble ionizable inorganic salt of a hydrohalic acid, and then acidifying the solution.

3. The method of preparing beta-chloro propionic acid which comprises reacting in aqueous solution beta-propiolactone and an alkali metal chloride.

4. The method of preparing beta-chloro propionic acid which comprises adding beta-propiolactone to an aqueous solution of an alkali metal chloride made acid by addition of hydrogen chloride.

5. The method of preparing beta-chloro propionic acid which comprises adding beta-propiolactone to an aqueous solution of sodium chloride, and then acidifying the solution.

6. The method of preparing a beta-halo carboxylic acid compound which comprises reacting in aqueous solution, a water-soluble saturated aliphatic beta-lactone and a water-soluble ionizable inorganic salt of a hydrohalic acid.

7. The method of preparing beta-thiocyano propionic acid which comprises reacting in aqueous solution beta-propiolactone and a water-soluble inorganic thiocyanate, and then acidifying the solution.

8. The method of preparing a beta-substituted propionic acid which comprises bringing together in aqueous solution beta-propiolactone and a water-soluble, ionizable, inorganic salt of a hydracid, and then acidifying the solution.

9. The method which comprises carrying out in aqueous solution at a pH in the range of 2 to 10 and at a temperature between −25 and 50° C. the chemical reaction represented by the equation:

wherein M+X− represents an ionized water-soluble inorganic salt, M+ being a monovalent cation and X− being a monovalent anion composed of 1 to 3 elements which form stable gaseous hydrides.

10. The method of claim 9 wherein X in the salt M+X− is the anion of a hydracid.

11. The method of claim 9 wherein X− in the salt M+X− is the anion of a hydrohalic acid.

12. The method which comprises reacting in aqueous solution and at a temperature between −25 and 100°.C. beta-propiolactone and a water-soluble ionized inorganic salt composed of a cation and a non-metallic anion, acidifying the solution and recovering the beta-substituted propionic acid thus formed.

13. The method which comprises carrying out in aqueous solution an ionic reaction between beta-propiolactone and a water-soluble ionized inorganic salt and recovering a beta-substituted inorganic salt compound from the reaction mixture.

14. The method which comprises reacting in aqueous solution and at a temperature between −25 and 100° C. a water-soluble aliphatic beta-lactone and a water-soluble ionized inorganic salt of a hydracid, acidifying the solution and recovering the beta-substituted saturated aliphatic carboxylic acid thus formed.

15. The method which comprises carrying out in aqueous solution at a temperature between −25 and 100° C. an ionic reaction between a water-soluble saturated aliphatic beta-lactone and a water-soluble ionized inorganic salt composed of a cation and a monovalent non-metallic anion, and recovering a beta-substituted saturated aliphatic carboxylic acid compound from the reaction mixture.

16. The method which comprises bringing together in aqueous solution a water-soluble aliphatic beta-lactone and an ionized water-soluble inorganic salt whereupon an ionic reaction occurs, and recovering a beta-substituted saturated aliphatic carboxylic acid compound from the reaction mixture.

17. The method which comprises carrying out an ionic reaction in a polar solvent for the reactants selected from the class consisting of water and alcohol between a water-soluble saturated aliphatic beta-lactone and a water-soluble ionized inorganic salt and recovering a beta-substituted saturated aliphatic carboxylic acid compound from the reaction mixture.

THOMAS L. GRESHAM.

REFERENCES CITED

The following references are of record in the file of this patent:

Fittig, et al., Liebig's Annalen, vol. 226, pp. 326–347 (1884).

Wislicenus, Liebig's Annalen, vol. 233, pp. 101–116 (1886).

Blaise, Compt. rendus (Fr. Acad. Sci.) vol. 124, pp. 89–91 (1897).

Blaise, Bull. soc. Chim. de France (3) vol. 29 pp. 335–336 (1903).

Blanc, Bull. soc. Chim. de France (3) vol. 33 pp. 886–890 (1905).

Wohlgemuth, Compt. rendus, vol. 158 pp. 1577–1578 (1914).

Johansson, Berichte (Deutsch. Chem. Gesell.) vol. 48, pp. 1262–1266 (1915).

Johansson, Chem. Zentrallblatt, vol. 1916 II, p. 557.

MacArdle, "Solvents in Synthetic Org. Chem." (1925) pp. 1–3.

Walton, Jour. Chem. Soc., 1940 pp. 438–442.

Spencer, et al., Jour. Am. Chem. Soc. vol. 63, pp. 1281–1285 (1941).

Certificate of Correction

Patent No. 2,449,987.  September 28, 1948.

THOMAS L. GRESHAM

It is hereby certified that errors appear in the printed specification of the above numbered patent requiring correction as follows:

Column 1, line 16, for "ketone" read *ketene*; column 7, line 17, Example XI, for "propiolacetone" read *propiolactone*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*